(12) United States Patent
Gentillet et al.

(10) Patent No.: US 7,323,794 B2
(45) Date of Patent: Jan. 29, 2008

(54) INDEPENDENT CONTROL OF OUTPUT CURRENT BALANCE BETWEEN PARALLELED POWER UNITS

(75) Inventors: Jerome Gentillet, Round Rock, TX (US); Lynn Simmons, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 449 days.

(21) Appl. No.: 10/987,635

(22) Filed: Nov. 12, 2004

(65) Prior Publication Data

US 2006/0107075 A1    May 18, 2006

(51) Int. Cl.
- H02J 1/10 (2006.01)
- H02J 1/14 (2006.01)
- G06F 1/28 (2006.01)

(52) U.S. Cl. ............. 307/35; 307/62; 307/38; 713/340

(58) Field of Classification Search ........ 713/340; 307/60, 62, 74, 82, 24, 25, 52, 35, 38, 39, 307/40; 700/295, 296
See application file for complete search history.

(56) References Cited

U.S. PATENT DOCUMENTS

| | | | | |
|---|---|---|---|---|
| 4,924,170 A | | 5/1990 | Henze | 323/272 |
| 5,200,643 A | * | 4/1993 | Brown | 307/53 |
| 6,236,582 B1 | | 5/2001 | Jalaleddine | 363/72 |
| 6,320,771 B1 | * | 11/2001 | Hemena et al. | 363/70 |
| 6,385,024 B1 | * | 5/2002 | Olson | 361/87 |
| 6,664,657 B2 | | 12/2003 | Hailey | 307/52 |
| 6,768,295 B2 | * | 7/2004 | Santin et al. | 324/76.79 |

OTHER PUBLICATIONS

Balogh, Laszlo, *Paralleling Power—Choosing and Applying the Best Technique for Load Sharing*, Texas Instruments Incorporated, pp. 6-1 through 6-30, 2003.

* cited by examiner

*Primary Examiner*—Michael Sherry
*Assistant Examiner*—Andrew Deschere
(74) *Attorney, Agent, or Firm*—Baker Botts L.L.P.

(57) ABSTRACT

An information handling system power supply system has a plurality of power supply units (PSUs) with outputs connected in parallel and a current balancing circuit for equalizing current from these outputs. A pseudo output current value may be added to the actual output current value for each PSU so that the parallel load sharing current balance system thinks all of the PSUs are sharing the load equally. This allows simple and inexpensive paralleling of differently rated PSUs without complex load sharing circuitry. Also, PSU stress factors may be easily compensated. For each PSU there may be a first voltage, $V_{S1}$, generated that is proportional to the output current of the respective PSU. A pseudo current bias voltage, $V_{Ibais}$, is added to the first voltage, $V_{S1}$, to produce a biased second voltage, $V_{S2}$, ($V_{S2}=V_{S1}+V_{Ibais}$). The biased second voltage, $V_{S2}$, now represents the apparent current output of the respective PSU when current load balancing each PSU of the power supply system. A standard current balance circuit may now balance all of the PSUs for what it thinks are equal output currents from each of the parallel connected PSUs.

12 Claims, 2 Drawing Sheets

INDEPENDENT CONTROL OF OUTPUT CURRENT BALANCE BETWEEN PARALLELED POWER UNITS

BACKGROUND OF THE INVENTION TECHNOLOGY

1. Field of the Invention

The present invention is related to information handling systems, and, more specifically, to independent control of output current balance between paralleled power supply units of the information handling system.

2. Description of the Related Art

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

An information handling system is powered from a power supply system that receives and converts alternating current (AC) power to direct current (DC) power at utilization voltages required by the electronic modules comprising the information handling system. The power supply system tightly regulates these utilization voltages and incorporates over current protection for each of the voltages. To further provide increased reliability of the power supply system, a plurality of power supply units (PSU) may be provided and coupled in parallel so that the loss or malfunction of one or more of the PSUs will not totally disable operation of the information handling system. When PSU output voltages are coupled in parallel some form of load sharing or current output equalization is commonly used to minimize the stresses on all of the power components. A general article addressing the various ways of load sharing between PSUs is discussed in an article from Texas Instruments entitled "Paralleling Power—Choosing and Applying the Best Technique for Load Sharing," by Laszlo Balogh. This article may be found at the Texas Instruments web site URL: http://focus.ti.com/lit/ml/slup207/slup207.pdf, and is hereby incorporated by reference for all purposes.

Parallel connected PSU current sharing techniques also have a penalty in terms of efficient performance. When all the paralleled PSUs deliver the same amount of current but all are not physically located at the same distance from the load, the PSUs located farthest from the current load will have additional unnecessary distribution power losses. In addition, power supply system load sharing has additional concerns in that not all of the PSUs comprising the power supply system may have equal power output ratings, nor may all of the parallel connected PSUs be functioning at maximum performance or capabilities. There are instances (system fan failure, etc.) where regular techniques of load sharing fail to optimize the reliability of the system because even though the output current is balanced from each parallel connected PSU, the stress levels are not (temperature, airflow, etc.).

For example, one or more of the PSUs may be operating at a higher temperature than the other PSUs, and/or one or more of the PSUs may be operating in a degraded mode of operation, e.g., a cooling fan has malfunctions, an air filter excessively restricts cooling air flow, etc. These factors require that not all of the PSUs can or should deliver the same amount of current to the information handling system load. Commonly owned U.S. Pat. No. 6,664,657 by Jeffrey C. Hailey, discloses a very sophisticated and complex method and system of load sharing between a plurality of PSUs having different operational stress factors. These stress factors may be differences in PSU temperatures, different PSU current output ratings, malfunctions of PSU components, etc. Using the stress factors, current outputs from the different PSUs may be optimized for best reliability of the power supply system. U.S. Pat. No. 6,664,657 is hereby incorporated by reference herein for all purposes. However, a simple and inexpensive way of independently controlling each PSU output current when coupled in parallel has not been available.

Therefore, what is needed a very simple and cost effective way to control load current balance between paralleled PSUs with an analog signal input, allowing additional performance in terms of efficiency and reliability of each PSU coupled in parallel and the ability to balance or unbalance each of the output currents depending upon stress factors of each PSU, and/or distant of each PSU from the information handling system load.

SUMMARY OF THE INVENTION

The invention remedies the shortcomings of the prior art by providing an information handling system power supply having the ability to unbalance each PSU by adding a pseudo output current value ("fake" current) to the measured actual output current value for each PSU so that the parallel load sharing current balance system thinks all of the PSUs are sharing the load equally. According to a specific exemplary embodiment, for each PSU there is a first voltage, $V_{S1}$, generated that is proportional to the output current of the respective PSU. A pseudo current bias voltage, $V_{Ibais}$, is added to the first voltage, $V_{S1}$, to produce a biased second voltage, $V_{S2}$, ($V_{S2} = V_{S1} + V_{Ibais}$). The biased second voltage, $V_{S2}$, now represents the apparent current output of the respective PSU when current load balancing each PSU of the power supply system. A standard current balance circuit may now balance all of the PSUs for what it thinks are equal output currents from each of the parallel connected PSUs.

The invention is particularly advantageous in enabling adjustment of a output current demand from the PSU when there is a stress factor associated with the PSU as more fully disclosed in commonly owned U.S. Pat. No. 6,664,657, incorporated by reference hereinabove. The invention may also be used for paralleling PSUs that do not have the same current output ratings. Normally, a simple current balance circuit assumes that all of the PSUs are the same and thus causes each of the PSUs to output the same amount of current to the common load (information handling system). By adding the pseudo output current value to the actual output current of a smaller capacity PSU, the current balance circuit may easily adjust all PSUs. The invention may also be used to reduce copper losses in the power distribution wiring of the information handling system by supplying the most current from a PSU closest to the load, e.g., shortest wiring. Since information handling systems generally operate at low voltages and high currents, the present invention is especially advantageous in reducing power losses.

A technical advantage of the present invention is a simple way of equalizing stress of a PSU by unbalancing its output current in favor of that stress. Another technical advantage is minimizing power distribution losses by having the PSU closest to the load supply most of the current thereto. Still another technical advantage is paralleling PSUs having different current output ratings and still being able to balance the PSU current outputs in proportion to their ratings. Other technical advantages should be apparent to one of ordinary skill in the art in view of what has been disclosed herein.

BRIEF DESCRIPTION OF THE DRAWINGS

A more complete understanding of the present disclosure and advantages thereof may be acquired by referring to the following description taken in conjunction with the accompanying drawings wherein.

Figure 1:
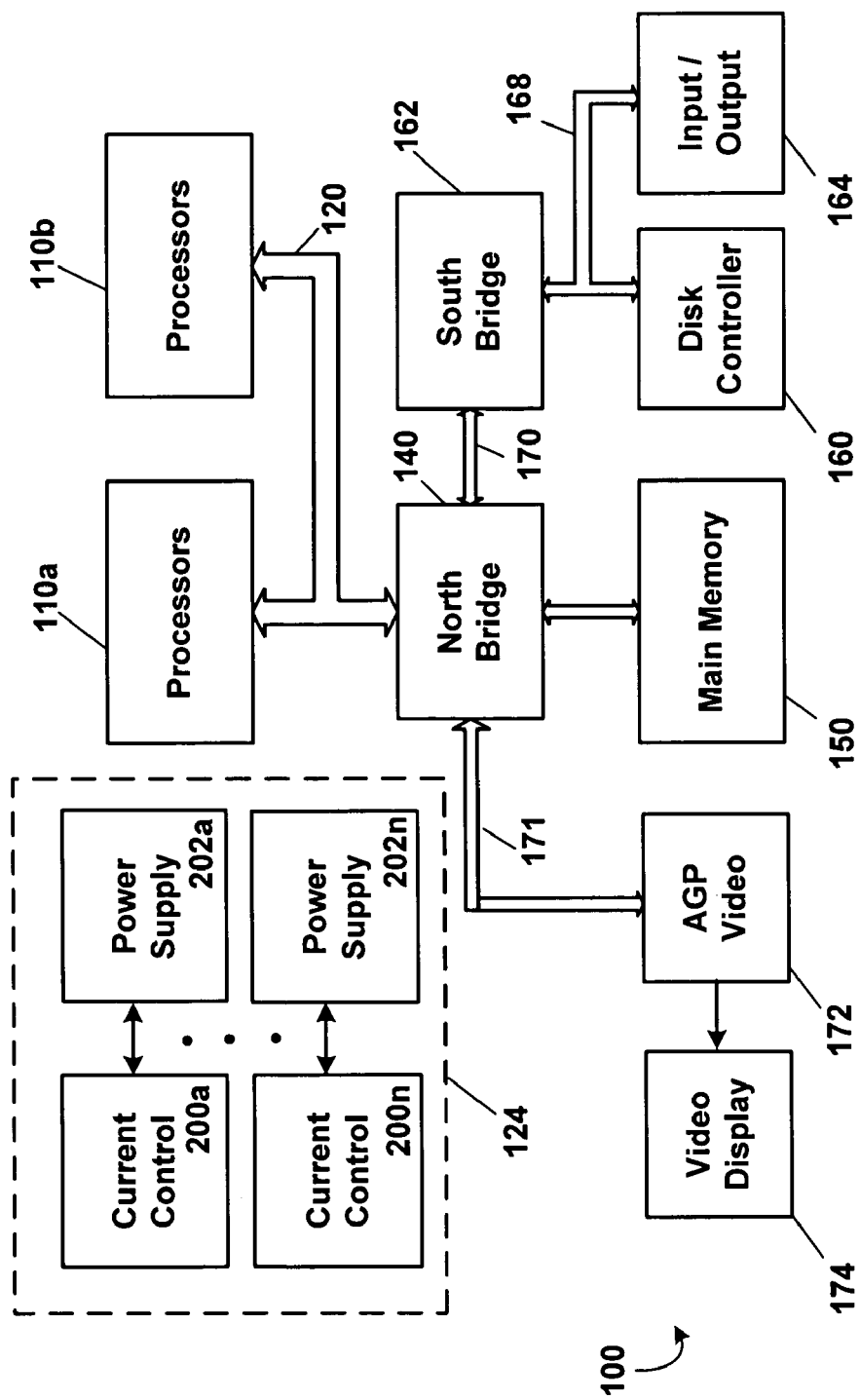
FIG. 1 is a schematic block diagram of an exemplary embodiment of an information handling system in combination with the invention.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific exemplary embodiments of the present invention are schematically illustrated. Like elements in the drawings will be represented by like numbers, and similar elements will be represented by like numbers with a different lower case letter suffix.

Referring to FIG. 1, an information handling system is illustrated having electronic components mounted on at least one printed circuit board (PCB) (motherboard) and communicating data and control signals therebetween over signal buses. In one embodiment, the information handling system is a computer system. The information handling system, generally referenced by the numeral 100, comprises a processor(s) 110 coupled to a host bus 120. A north bridge 140, which may also be referred to as a memory controller hub or a memory controller, is coupled to a main system memory 150. The north bridge 140 is coupled to the system processor(s) 110 via the host bus(es) 120. The north bridge 140 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions, such as main memory control functions, typically reside in the north bridge 140. In addition, the north bridge 140 provides bus control to handle transfers between the host bus 120 and a second bus(es), e.g., PCI bus 170, AGP bus 171 coupled to video graphics display 174, etc. A second bus(es) 168 may also comprise other industry standard buses or proprietary buses, e.g., ISA, SCSI, USB buses through a south bridge(s) (bus interface) 162. These secondary buses 168 may have their own interfaces and controllers, e.g., ATA disk controller 160 and input/output interface(s) 164, and interface with a disk controller, a network interface card, a graphics controller, a hard disk and the like. A power supply 122 is coupled to and powers the information handling system 100. A power supply system 124 comprises a plurality of power supply units (PSUs) 202 and a respective plurality of current control circuits 200 for current biasing the output currents of the parallel connected PSUs 202.

Figure 2:
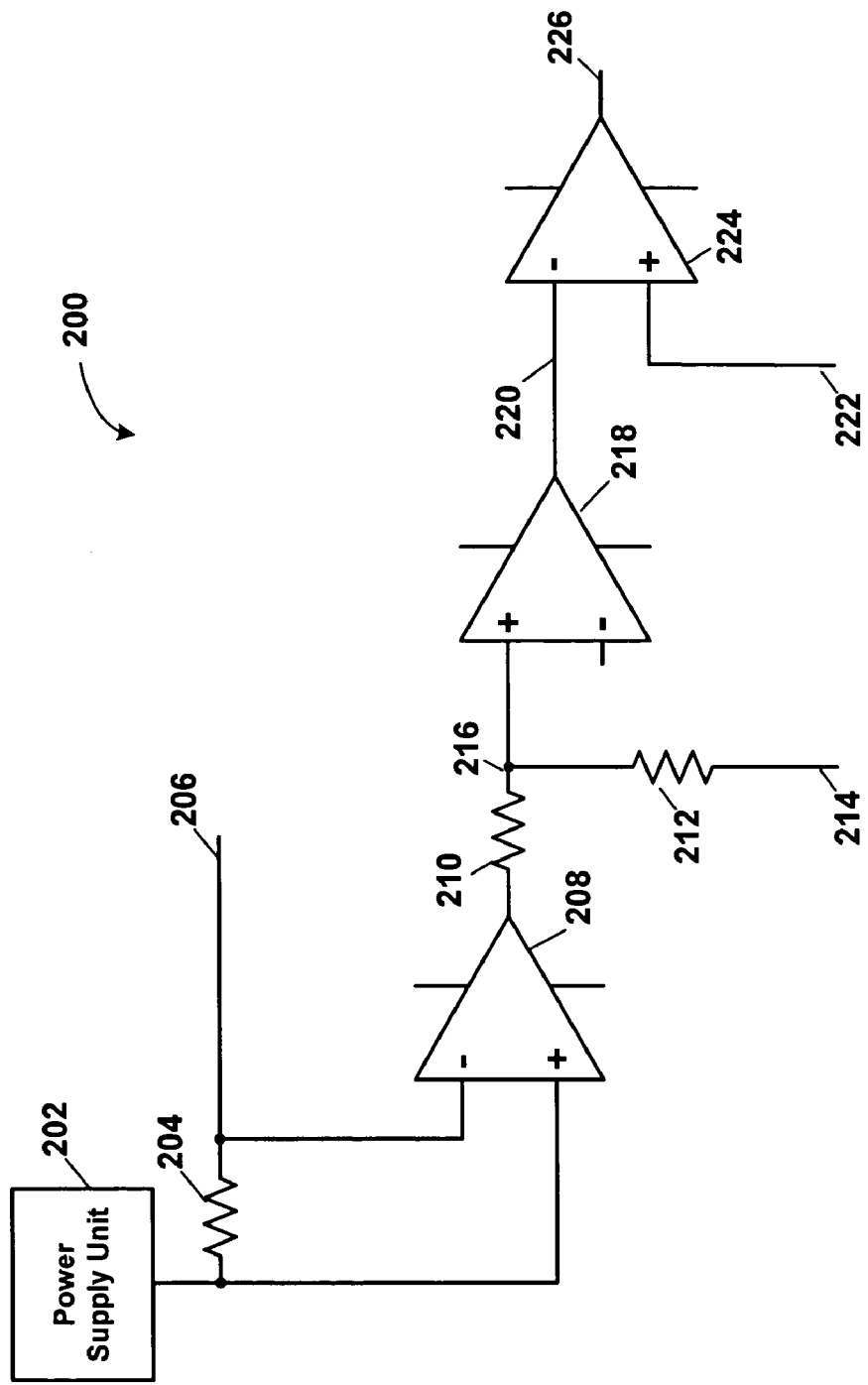
FIG. 2 is a schematic diagram of a circuit for controlling a PSU current output by adding a pseudo output current value, according to a specific exemplary embodiment of the invention.

Referring to FIG. 2, depicted is a schematic diagram of a circuit for controlling a PSU current output by adding a pseudo output current value, according to a specific exemplary embodiment of the invention. For each PSU 202 there may be an operational amplifier 208 that measures the voltage drop across a series connected resistor 204 and thereby generates a first voltage, $V_{S1}$, that is proportional to the output current 206 of the respective PSU 202. The output of the operational amplifier 208 ($V_{S1}$) is coupled to a summing resistor 210. A pseudo current bias voltage 214, $V_{Ibais}$, is coupled through another summing resistor 212 and is thereby added to the first voltage, $V_{S1}$, in summing operational amplifier 218 to produce a biased second voltage 220, $V_{S2}$, where $V_{S2}=V_{S1}+V_{Ibais}$. The biased second voltage 220, $V_{S2}$, now represents the apparent current output of the respective PSU 202 and may be used for current load balancing each PSU of the power supply system. The summing operational amplifier 218 may be non-inverting or inverting. If the summing operational amplifier 218 is inverting then another inverting, unity gain operational amplifier (not shown) may convert inverted output voltage ($-V_{S2}$) to the correct polarity sign voltage for the biased second voltage 220, $V_{S2}$, used for further load share balancing.

An "Ishare" bus voltage 222 is coupled to an input of a current balancing operational amplifier 224 that compares the biased second voltage 220, $V_{S2}$, which is proportional to the output current of the respective PSU and pseudo current bias voltage 214, $V_{Ibais}$, with the Ishare bus voltage 222. The Ishare bus voltage 222 is proportionally representative of total current output of the paralleled PSUs, e.g., total current output of the power supply system, divided by the number of parallel connected PSUs of the power supply system. When the biased second voltage 220, $V_{S2}$, is substantially equal to the Ishare bus voltage 222, then the respective PSU 202 is assumed to be at an output current equilibrium as determined by a standard current balancing system for parallel connected PSUs. Even though the actual output current of the PSU may be less than the apparent current, the current balancing system sees all PSUs producing the same amount of current. Biasing circuitry for the operational amplifier is not shown for clarity. Standard gain and offset biasing of operational amplifiers may be used as is well known to those having ordinary skill in the design of analog circuits.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system having independent control of output current balance between paralleled power units, said system comprising:
   an information handling system having a plurality of power supply units, the plurality of power supply units adapted for receiving power from a power source and providing voltages necessary to power the information handling system, the plurality of power supply unit outputs being connected in parallel, wherein output current from each of the plurality of power supply units is independently controllable;
   a current measuring circuit for each of the plurality of power supply units, the current measuring circuit measures actual current drawn from a respective one of the plurality of power supply units;
   a current adding circuit for each of the plurality of power supply units, wherein the current adding circuit adds a pseudo current to the measured actual current for generating an apparent current of the respective one of the plurality of power supply units; and
   a load balancing circuit for balancing the apparent current of each of the plurality of power supply units to a shared current value, wherein the pseudo current is used to reduce the actual current supplied by the respective one of the plurality of power supply units.

2. The information handling system according to claim 1, wherein the current measuring circuit comprises a series connected resistor coupled to an output of the power supply unit and a differential input first operational amplifier having a positive input coupled to a power source side of the series connected resistor, a negative input coupled to a load side of the series connected resistor, and an output having a voltage proportional to the actual current.

3. The information handling system according to claim 2, wherein the current adding circuit comprises a second operational amplifier coupled to the output of the first operational amplifier, the second operational amplifier is configured as an adder for adding together the output voltage proportional to the actual current and a pseudo voltage proportional to the pseudo current.

4. The information handling system according to claim 3, wherein the load balancing circuit comprises a third operational amplifier having a first input coupled to an output of the second operational amplifier, a second input coupled to a shared voltage value proportional to the shared current value, wherein the third operational amplifier has an output that is the difference between the output voltage of the second operational amplifier and the shared voltage value which is used for balancing current outputs of the respective ones of the plurality of power supply units.

5. An apparatus for independently controlling output current balance between paralleled power units, comprising:
   a plurality of power supply units having their outputs connected in parallel, wherein output current from each of the plurality of power supply units is independently controllable;
   a current measuring circuit for each of the plurality of power supply units, the current measuring circuit measures actual current drawn from a respective one of the plurality of power supply units;
   a current adding circuit for each of the plurality of power supply units, wherein the current adding circuit adds a pseudo current to the measured actual current for generating an apparent current of the respective one of the plurality of power supply units; and
   a load balancing circuit for balancing the apparent current of each of the plurality of power supply units to a shared current value, wherein the pseudo current is used to reduce the actual current supplied by the respective one of the plurality of power supply units.

6. The apparatus according to claim 5, wherein the current measuring circuit comprises a series connected resistor coupled to an output of the power supply unit and a differential input first operational amplifier having a positive input coupled to a power source side of the series connected resistor, a negative input coupled to a load side of the series connected resistor, and an output having a voltage proportional to the actual current.

7. The apparatus according to claim 6, wherein the current adding circuit comprises a second operational amplifier coupled to the output of the first operational amplifier, the second operational amplifier is configured as an adder for adding together the output voltage proportional to the actual current and a pseudo voltage proportional to the pseudo current.

8. The apparatus according to claim 7, wherein the load balancing circuit comprises a third operational amplifier having a first input coupled to an output of the second operational amplifier, a second input coupled to a shared voltage value proportional to the shared current value, wherein the third operational amplifier has an output that is the difference between the output voltage of the second operational amplifier and the shared voltage value which is used for balancing current outputs of the respective ones of the plurality of power supply units.

9. A method of independently controlling output current balance between paralleled power units, said method comprising the steps of:
provided a power supply system in an information handling system that receives power from an external power source and provides voltages necessary to power the information handling system, the power supply system having a plurality of power supply units, wherein output current from each of the plurality of power supply units is independently controllable;
measuring an actual current drawn from each of the plurality of power supply units; and
adding a pseudo current to the actual current for creating an apparent current; and balancing the apparent current for each of the plurality of power supply units to a shared current value, wherein the pseudo current is used to reduce the actual current supplied by the respective one of the plurality of power supply units.

10. The method according to claim 9, wherein the step of measuring the actual current is done with a series connected resistor and a first differential operational amplifier having an output voltage proportional to the actual current.

11. The method according to claim 10, wherein the step of adding a pseudo current to the actual current comprises the step of summing the output voltage of the first differential amplifier with a pseudo voltage proportional to the pseudo current to produce an apparent voltage.

12. The method according to claim 11, wherein the step of balancing the apparent current for each of the plurality of power supply units to a shared current value comprises the step of comparing the apparent voltage to a shared voltage representative of the shared current value.

* * * * *